United States Patent
Kim et al.

(10) Patent No.: US 7,477,681 B2
(45) Date of Patent: Jan. 13, 2009

(54) METHOD FOR GENERATING A PREAMBLE SEQUENCE GROUP

(75) Inventors: Hyoung-Gwan Kim, Seoul (KR); Sang-Kyung Sung, Suwon-si (KR); Jae-Yoel Kim, Gunpo-si (KR); Joon-Goo Park, Seoul (KR); Jae-Woon Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/836,623

(22) Filed: Aug. 9, 2007

(65) Prior Publication Data

US 2008/0037616 A1  Feb. 14, 2008

Related U.S. Application Data

(62) Division of application No. 10/889,276, filed on Jul. 12, 2004, now Pat. No. 7,366,229.

(30) Foreign Application Priority Data

Oct. 27, 2003 (KR) ............................... 2003-75271

(51) Int. Cl.
*H04B 1/00* (2006.01)

(52) U.S. Cl. ..................................................... 375/150

(58) Field of Classification Search ................ 375/142, 375/143, 150, 157, 152, 231, 343; 704/216, 704/218, 237, 263; 708/5, 422, 813; 342/108, 342/145, 189, 378; 340/3.21; 370/292; 379/406.1; 455/67.11

See application file for complete search history.

(56) References Cited

U.S. PATENT DOCUMENTS

| 5,559,829 A |   | 9/1996  | Le Strat et al.          |
|-------------|---|---------|--------------------------|
| 6,141,373 A |   | 10/2000 | Scott                    |
| 6,154,486 A |   | 11/2000 | Scott et al.             |
| 6,363,107 B1|   | 3/2002  | Scott                    |
| 2002/0176519 A1 | * | 11/2002 | Chiodini et al. ............. 375/324 |
| 2004/0047435 A1 | * | 3/2004  | Su ............................ 375/316 |

FOREIGN PATENT DOCUMENTS

| EP | 1 168 700 | 1/2000 |
| EP | 1 209 843 | 5/2002 |
| EP | 1 367 742 | 12/2003 |

* cited by examiner

*Primary Examiner*—Sam K Ahn
(74) *Attorney, Agent, or Firm*—The Farrell Law Firm, PC

(57) ABSTRACT

Provided is a method for generating a preamble sequence group. The method includes creating a preamble sequence, calculating a cross-correlation value between sequences using the created preamble sequence, determining a limit cross-correlation value using the cross-correlation value to construct a preamble set used in the communication system, calculating a preamble set that satisfies the determined limit cross-correlation value, and terminating construction of the preamble set.

3 Claims, 6 Drawing Sheets

METHOD FOR GENERATING A PREAMBLE SEQUENCE GROUP

This application claims priority under 35 U.S.C. § 119 to an application entitled "Method for Generating Preamble Sequence Group" filed in the Korean Intellectual Property Office on Oct. 27, 2003 and assigned Serial No. 2003-75271, the contents of which are incorporated herein by reference. This application is a divisional of and claims priority under 35 U.S.C. § 121 to U.S. application Ser. No. 10/889,276 filed in the U.S. Patent and Trademark Office on Jul. 12, 2004, now U.S. Pat. No. 7,366,229 the contents of which are incorporated herein by reference.

BACKGROUND OF THE INVENTION

1. Field of the Invention

The present invention relates generally to a method for generating a preamble set or group in a communication system and an apparatus adopting the method, and in particular, to a method for generating an optimal preamble set using a plurality of sequences used to increase the limited number of channels, and an apparatus adopting the method.

2. Description of the Related Art

Generally, communication systems support communication services and include transmitters and receivers.

FIG. 1 is a block diagram of a general communication system. Referring to FIG. 1, a transmitter 10 and a receiver 20 provide communication services using frames. The transmitter 10 and the receiver 20 need to acquire synchronization information for accurate transmission and reception of the frames.

In order to acquire the synchronization information of the receiver 20, the transmitter 10 transmits to the receiver 20 a synchronization signal indicating the start position of a frame transmitted to the receiver 20. Upon receiving the synchronization signal and the frame transmitted from the transmitter 10, the receiver 20 detects the start position of the received frame, i.e. frame timing, using the received synchronization signal. The receiver 20 demodulates the received frame using the detected frame timing. A specific preamble sequence, which has been previously agreed upon between the transmitter 10 and the receiver 20, is used as the synchronization signal.

Various methods such as the use of a preamble or a pilot signal are used to acquire synchronization with transmitted frames in communication systems. In the case of acquiring synchronization using a preamble as mentioned above, it is a general practice to use a single preamble.

FIG. 2 illustrates a frame structure used in the general communication system. As shown in FIG. 2, a frame is composed of a preamble 30 and data 40. The preamble 30 is used for frame synchronization and channel estimation. The data 40 includes data selected and requested by a user for transmission and/or control information of the communication system.

The frame structure may have a fixed format according to the communication system as shown in FIG. 2, but in other communication systems, the preamble 30 may be positioned in the middle of or at the end of the data 40. In other words, a preamble in a frame may be positioned differently according to communication systems.

The preamble 30 shown in FIG. 2 is comprised of a first signal 32 and a second signal 34. The first signal 32 is used for frame synchronization and the second signal 34 is used for channel estimation. The structure of the preamble 30 shown in FIG. 2 can be formed by divided into two parts, i.e. the first signal 32 and the second signal 34, but may also be formed repetitively using a single signal or using several concatenated signals without dividing into two parts. In some communication systems, the first signal 32 is divided into two parts: one for frame synchronization and the other for packet synchronization.

FIG. 3 is a block diagram of a transmitter for the general communication system.

A data creator 51 receives data, creates transmission data, and transmits the created transmission data to a first multiplexer 54. A media access control (MAC) header creator 52 creates a MAC header suitable for frames and transmits the created MAC header to the first multiplexer 54. A physical (PHY) header creator 53 creates a PHY header suitable for the communication system and transmits the created PHY header to the first multiplexer 54. The first multiplexer 54 multiplexes, i.e. mixes signals transmitted from the data creator 51, the MAC header creator 52, and the PHY header creator 53, and transmits a resultant signal to a second multiplexer 57. The resultant signal is referred to as transmission data.

A preamble creator 56 creates a preamble suitable for the communication system and transmits the created preamble to the second multiplexer 57. The transmission data multiplexed by the first multiplexer 54 and the preamble created by the preamble creator 56 are input to the second multiplexer 57. The second multiplexer 57 combines the transmission data from the first multiplexer 54 with the preamble from the preamble creator 56 to convert them into a transmission frame, and transmits the transmission frame to a receiver side through a transmission antenna 58.

FIG. 4 is a block diagram of a receiver for the general communication system. Referring to FIG. 4, the frame transmitted from the transmitter of FIG. 3 is received through a reception antenna 61. The frame received through the reception antenna 61 is sent to a preamble analyzer 62 and a demultiplexer 63. The preamble analyzer 62 analyzes the preamble in the received frame and detects synchronization information and channel estimation information. The preamble analyzer 62 determines the start position of the received frame using the synchronization information and the channel estimation information.

When the start point of the received frame is detected, the demultiplexer 63 separates the PHY header, the MAC header, and the data from the transmission data of the received frame with reference to the start position of the received frame. The separated signals are input to a PHY header analyzer 64, an MAC header analyzer 65, and a data restorer 66.

The PHY header analyzer 64 analyzes the PHY header transmitted from the demultiplexer 63 and transmits the result of the header analysis to the data restorer 66. The MAC header analyzer 65 analyzes the MAC header transmitted from the demultiplexer 63 and transmits the result of the header analysis to the data restorer 66. The data restorer 66 restores the data transmitted from the demultiplexer 63 using the results of the header analysis transmitted from the PHY header analyzer 64 and the MAC header analyzer 65.

The preamble sequence, which is agreed upon between the transmitter and the receiver of the communication system, may vary from system to system, but an aperiodic recursive multiplex (ARM) sequence will be used as the preamble sequence herein as an example. The preamble sequence that can be applied to the present invention is not limited to the ARM sequence, and may include any possible sequences that can be used as preambles. The ARM sequence exhibits superior auto-correlation in an aperiodic environment where sequences are not periodically transmitted.

Superior auto-correlation indicates that auto-correlation is high when the sequences are synchronized and auto-correlation is relatively low in other cases.

FIG. 5 is a block diagram of an ARM sequence generation apparatus that can generate an ARM sequence of a length 128. As shown in FIG. 5, when one of the possible 2-bit combinations of real numbers ('00', '01', '10', or '11') is input as an input signal, the input signal is also input to a first multiplexer 81. The input signal is input to a first XOR operator 71.

At the same time, a first signal generator 91 generates a signal '01' or '10' and outputs the generated signal to the first XOR operator 71. The first XOR operator 71 performs an exclusive or operation on the signal output from the first signal generator 91 and the input signal, and outputs a result of the XOR operation to the first multiplexer 81. The first multiplexer 81 alternatively multiplexes the input signal and a signal output from the first XOR operator 71 and creates an ARM sequence of 4 bits. The first multiplexer 81 outputs the created 4-bit ARM sequence to a second multiplexer 82 and a second XOR operator 72.

A second signal generator 92 generates a signal '0101' or '1010' and outputs the generated signal to the second XOR operator 72 at the same time that the 4-bit ARM sequence is input to the second multiplexer 82 from the first multiplexer 81. The second XOR operator 72 performs an XOR operation on the signal output from the second signal generator 92 and the 4-bit ARM sequence output from the first multiplexer 81, and outputs a result of the XOR operation to the second multiplexer 82. The second multiplexer 82 alternatively multiplexes the signal output from the first multiplexer 81 and the signal output from the second XOR operator 72 to create an ARM sequence of 8 bits and outputs the created 8-bit ARM sequence to a third multiplexer 83 and a third XOR operator 73.

A third signal generator 93 generates a signal '01010101' or '10101010' and outputs the generated signal to the third XOR operator 73 at the same time that the 8-bit ARM sequence is input to the third multiplexer 83 from the second multiplexer 82. The third XOR operator 73 performs an XOR operation on the signal output from the third signal generator 93 and the 8-bit ARM sequence output from the second multiplexer 82, and outputs a result of the XOR operation to the third multiplexer 83. The third multiplexer 83 alternatively multiplexes the signal output from the second multiplexer 82 and the signal output from the third XOR operator 73 to create an ARM sequence of 16 bits and outputs the created 16-bit ARM sequence to a fourth multiplexer 84 and a fourth XOR operator 74.

A fourth signal generator 94 generates a signal '0101010101010101' or '1010101010101010' and outputs the created signal to the fourth XOR operator 74 at the same time that the 16-bit ARM sequence is input to the fourth multiplexer 84 from the third multiplexer 83. The fourth XOR operator 74 performs an XOR operation on the signal output from the fourth signal generator 94 and the 16-bit ARM sequence output from the third multiplexer 83, and outputs a result of the XOR operation to the fourth multiplexer 84. The fourth multiplexer 84 alternatively multiplexes the signal output from the third multiplexer 83 and the signal output from the fourth XOR operator 74 to create an ARM sequence of 32 bits, and outputs the created 32-bit ARM sequence to a fifth multiplexer 85 and a fifth XOR operator 75.

A fifth signal generator 95 generates a signal '01010101010101010101010101010101' or '10101010101010101010101010101010' and outputs the created signal to the fifth XOR operator 75 at the same time that the 32-bit ARM sequence is input to the fifth multiplexer 85 from the fourth multiplexer 84. The fifth XOR operator 75 performs an XOR operation on the signal output from the fifth signal generator 95 and the 32-bit ARM sequence output from the fourth multiplexer 84 and outputs a result of the XOR operation to the fifth multiplexer 85. The fifth multiplexer 85 alternatively multiplexes the signal output from the fourth multiplexer 84 and the signal output from the fifth XOR operator 75 to create an ARM sequence of 64 bits and outputs the created 64-bit ARM sequence to a sixth multiplexer 86 and a sixth XOR operator 76.

A sixth signal generator 96 generates a signal '0101010101010101010101010101010101010101010101010101010101010101' or '1010101010101010101010101010101010101010101010101010101010101010' and outputs the created signal to the sixth XOR operator 76 at the same time that the 64-bit ARM sequence is input to the sixth multiplexer 86 from the fifth multiplexer 85. The sixth XOR operator 76 performs an XOR operation on the signal output from the sixth signal generator 96 and the 64-bit ARM sequence output from the fifth multiplexer 85, and outputs a result of the XOR operation to the sixth multiplexer 86. The sixth multiplexer 86 alternatively multiplexes the signal output from the fifth multiplexer 85 and the signal output from the sixth XOR operator 76 to create an ARM sequence of 128 bits.

The created 128-bit ARM sequence is used for detecting frame synchronization in the preamble analyzer 62 of FIG. 4. The length of the ARM sequence is extendable by powers of 2 such as 64, 128, 256, 512, and the like. Since the ARM sequence is produced from a plurality of inputs, the number of sequences of the ARM sequence is equal to two times the length of the ARM sequence. For example, the 128-bit ARM sequence shown in FIG. 5 has a total of 256 (=128* 2) sequences.

Conventional preamble signals are only used for detection of frame synchronization and channel estimation in receivers of communication systems.

SUMMARY OF THE INVENTION

It is, therefore, an object of the present invention to provide a method for generating a superior sequence set from a sequence candidate group that can be used as preambles, and an apparatus adopting the method.

To achieve the above and other objects, there is provided a method for generating a preamble sequence group in a communication system having a transmitter and a receiver. The method comprises creating a preamble sequence, calculating a cross-correlation value between sequences using the created preamble sequence, determining a limit cross-correlation value using the cross-correlation value to construct a preamble set used in the communication system, calculating a preamble set that satisfies the determined limit cross-correlation value, and terminating construction of the preamble set.

According to the present invention, a preamble set useful for user or channel discrimination is provided using a plurality of preambles, thereby stabilizing user or channel discrimination.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
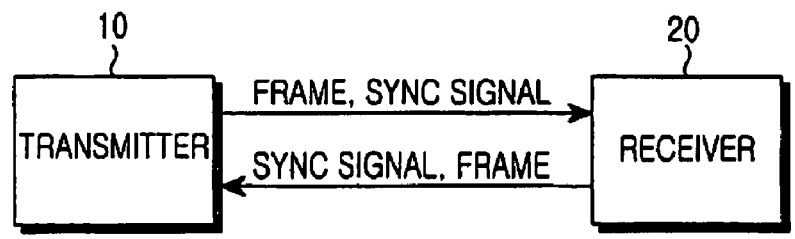
FIG. 1 is a block diagram of a general communication system.
Figure 2:
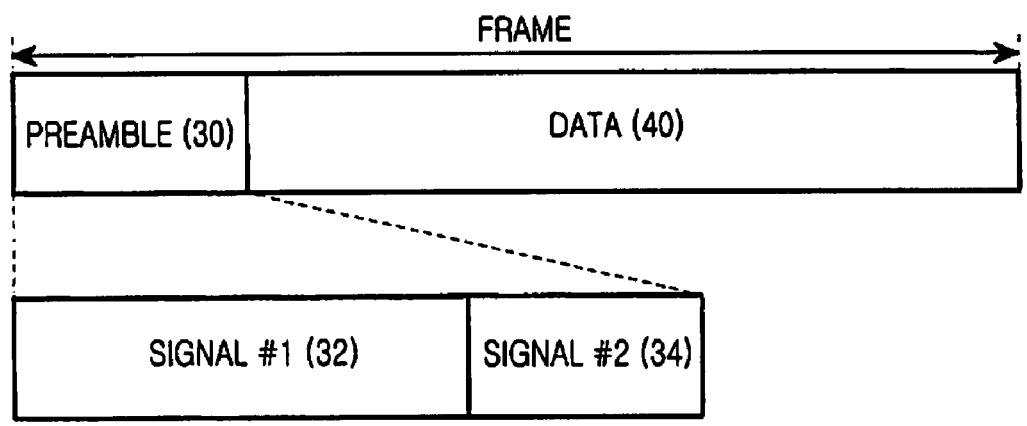
FIG. 2 illustrates a frame structure used in the general communication system.
Figure 3:
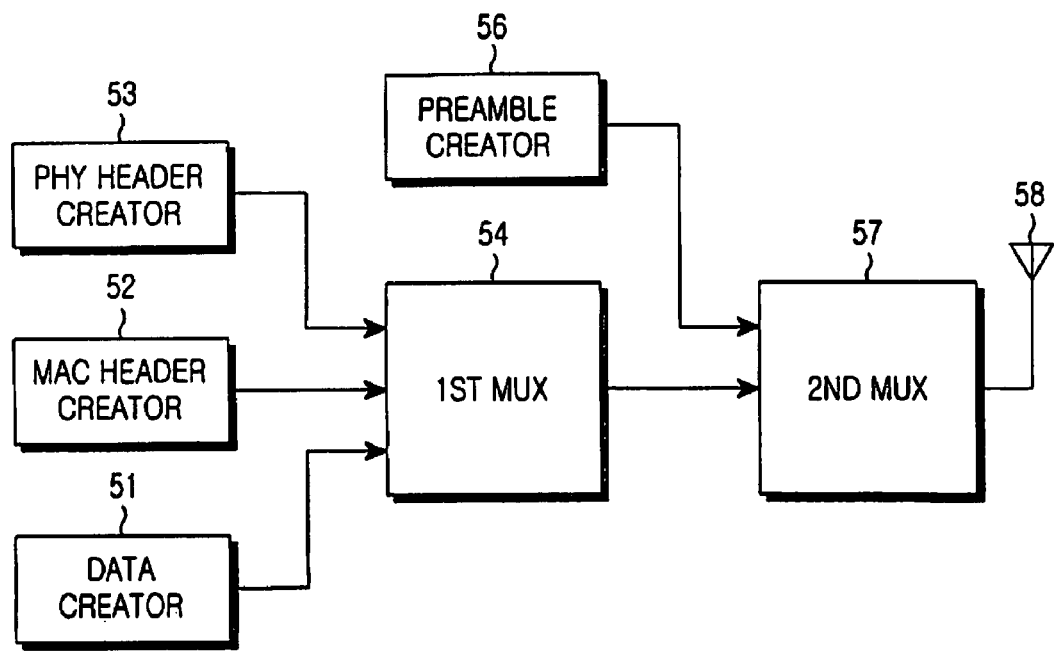
FIG. 3 is a block diagram of a transmitter for the general communication system.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

In the present invention, a plurality of preambles is used for user or channel discrimination. A plurality of preamble signals or sequences, instead of a single preamble signal, should be used simultaneously for a communication system. Preamble signals should satisfy two conditions. First, the preamble signals should have superior characteristics. Second, the preamble signals should not be alike, that is, correlation between different preamble signals should be sufficiently low.

When a plurality of preamble sequences is used, receivers should be able to discriminate from among the preambles. When the receivers check correlation with other preamble signals except for those used for the receivers, the correlation should be sufficiently low so as to reduce the possibility that other preamble signals are regarded as those used for the receivers.

Figure 5:
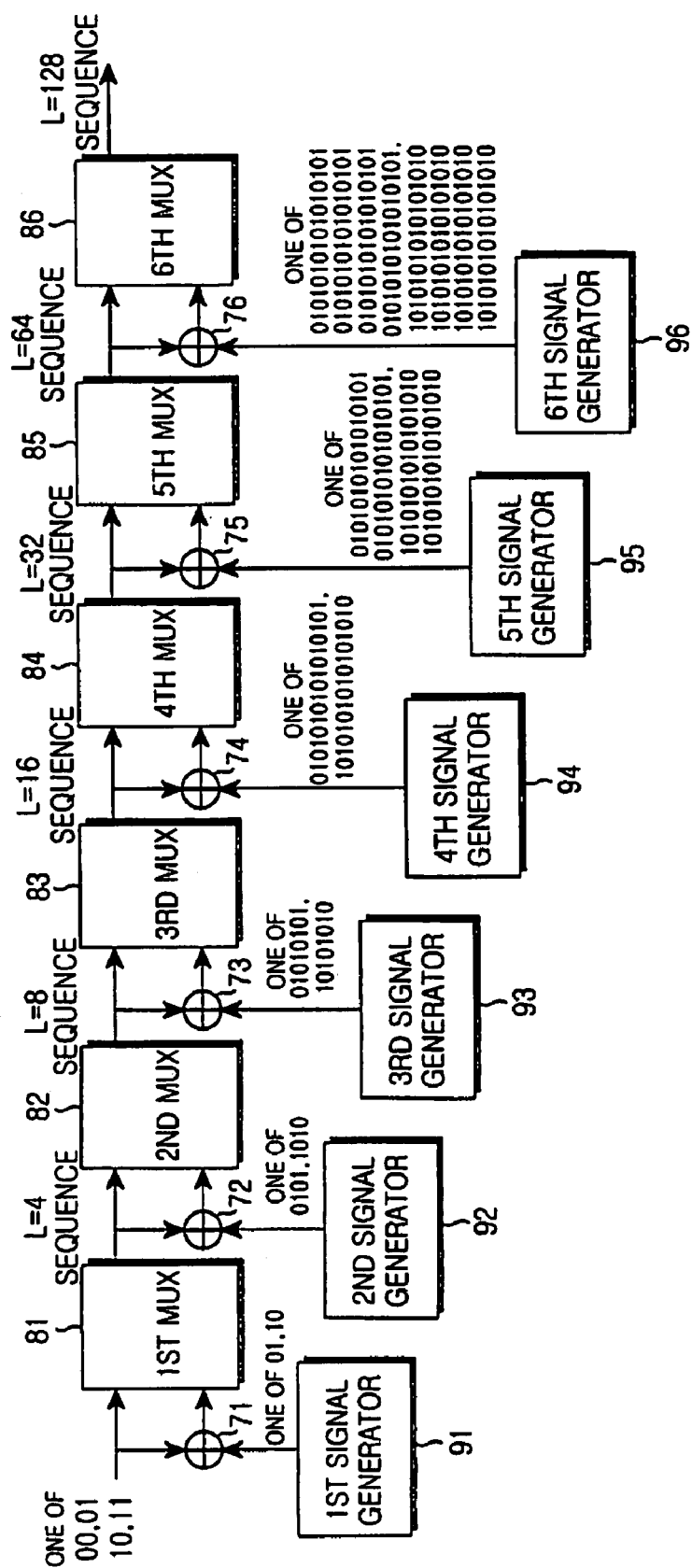
FIG. 5 is a block diagram of an aperiodic recursive multiplex (ARM) sequence generation apparatus.

A preamble set used for user or channel discrimination can be structured in different forms. However, in the present invention, an ARM sequence having superior auto-correlation will be described. An ARM sequence set has a variable structure that provides preambles whose number is two times the length of the ARM sequence set, as shown in FIG. 5. ARM sequences are created to calculate a cross-correlation value of each of the ARM sequences. A limit correlation value is determined in relation to the number of preambles to be used for a desired communication system. Then preambles that satisfy the determined correlation value are acquired, and a preamble set is comprised of the acquired preambles.

Figure 6:
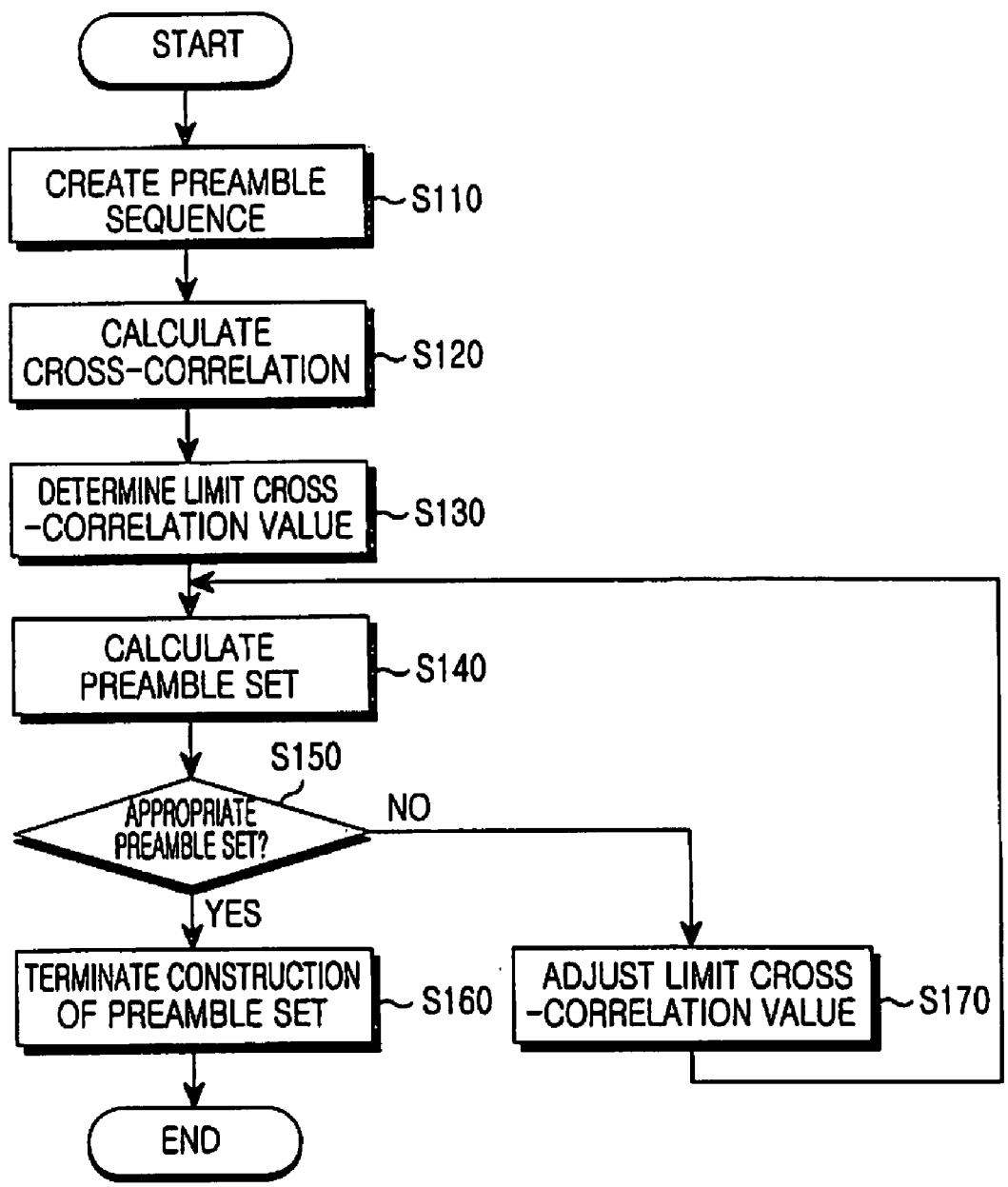
FIG. 6 is a flowchart illustrating a method for acquiring a preamble set according to an embodiment of the present invention.

FIG. 6 is a flowchart illustrating a method for acquiring a preamble set according to an embodiment of the present invention.

In step S110, an ARM sequence is created to acquire preamble sequences. In step S120, cross-correlation values between the preamble sequences are calculated using the created ARM sequence. In step S130, a limit correlation value is determined to provide the optimal preamble set to the communication system using the calculated cross-correlation values. In step S140, a preamble set that satisfies the determined limit cross-correlation value is constructed. In step S150, it is determined if the generated preamble set is suitable for the communication system. If the generated preamble set is suitable for the communication system, construction of the preamble set is terminated in step S160.

However, if the generated preamble set is not suitable for the communication system, the limit cross-correlation value is adjusted in step S170, and steps S140 and S150 are performed again. The generated preamble set is applied to the communication system.

Figure 7:
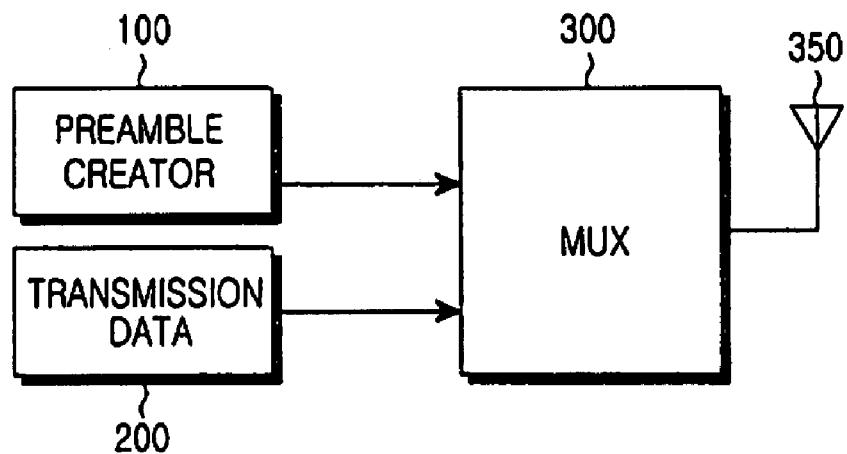
FIG. 7 is a block diagram of a transmitter of a communication system using a preamble set according to an embodiment of the present invention.

FIG. 7 is a block diagram of a transmitter in a communication system using the preamble set according to an embodiment of the present invention. Referring to FIG. 7, a preamble creator 100 creates preamble signals according to an embodiment of the present invention and transmits the created preamble signals to a multiplexer 300. Transmission data 200 is transmission data to be transmitted to a receiver and includes an MAC header and a PHY header. The multiplexer 300 performs multiplexing, i.e. multiplexes the preamble signals created by the preamble creator 100 and the transmission data 200, and transmits a resultant signal to the receiver through a transmission antenna 350.

Figure 8:
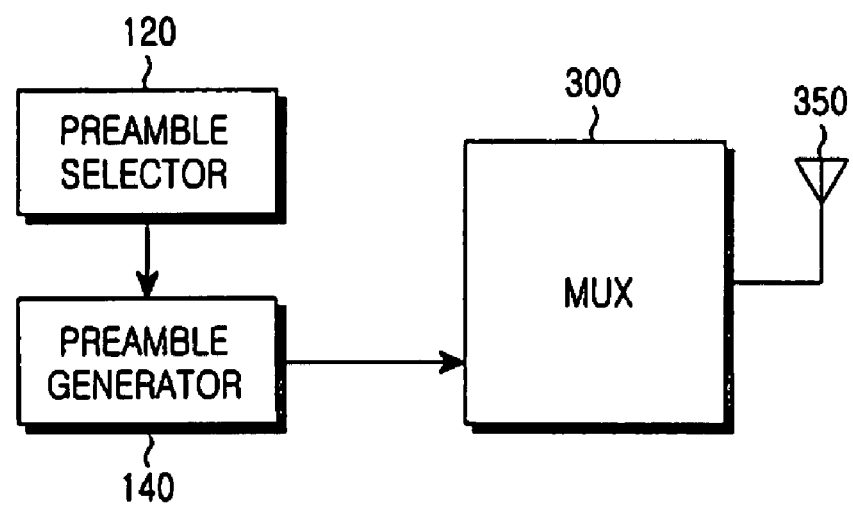
FIG. 8 is a block diagram of the preamble creator of FIG. 7 according to an embodiment of the present invention.

FIG. 8 is a block diagram of the preamble creator 100 of FIG. 7. Referring to FIG. 7, the preamble creator 100 includes a preamble selector 120 and a preamble generator 140. The preamble selector 120 selects one of the preambles available in a preamble set that is agreed upon between the transmitter and the receiver in the communication system, and transmits the preamble information to the preamble generator 140. The preamble generator 140 creates the selected preamble using the preamble information transmitted from the preamble selector 120 and outputs the created preamble to the multiplexer 300.

Figure 9:
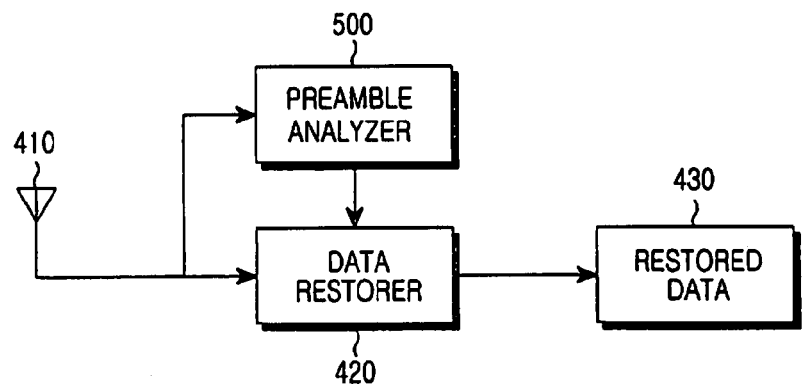
FIG. 9 is a block diagram of a receiver of a communication system using a preamble set according to an embodiment of the present invention.

FIG. 9 is a block diagram of a receiver of the communication system using the preamble set according to an embodiment of the present invention. A frame signal transmitted from the transmitter of FIG. 7 is received through a reception antenna 410, and input to a preamble analyzer 500 and a data restorer 420.

The preamble analyzer 500 analyzes the received frame signal, detects the preamble information, synchronization information and channel estimation information, and transmits the detected information to the data restorer 420. The data restorer 420 restores the received data based on the information transmitted from the preamble analyzer 500, and outputs the restored data 430.

Figure 10:
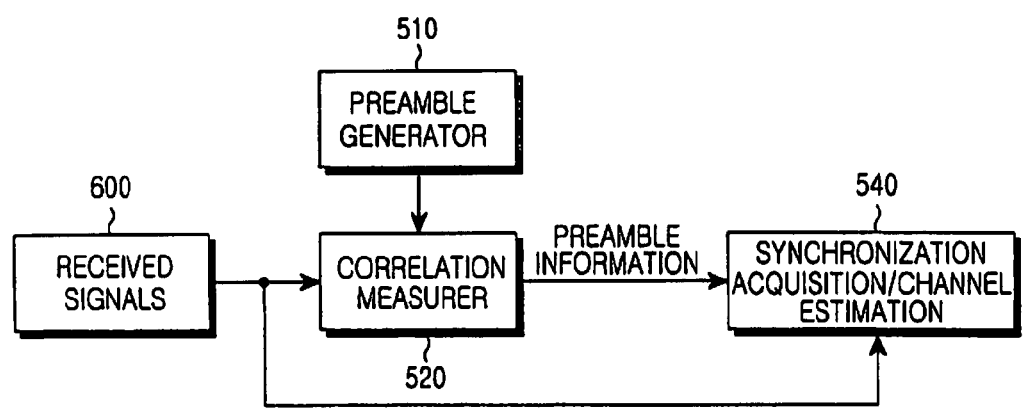
FIG. 10 is a block diagram of the preamble analyzer of FIG. 9 according to an embodiment of the present invention.

FIG. 10 is a block diagram of the preamble analyzer 500 of FIG. 9. Referring to FIG. 10, the preamble analyzer 500 includes a preamble generator 510, a correlation measurer 520, and a synchronization acquisition/channel estimation unit 540.

A received signal 600 received through the reception antenna 410 is a frame signal transmitted from the transmitter of FIG. 7, and is input into the correlation measurer 520. The preamble generator 510 generates preambles that are agreed upon between the transmitter and the receiver of the communication system, and inputs the preambles to the correlation measurer 520.

The correlation measurer 520 measures cross-correlation between the frame signal, i.e., the received signal 600, and the preambles generated by the preamble generator 510, and detects preambles included in the received frame signal. The correlation measurer 520 transmits information on the detected preambles to the synchronization acquisition/channel estimation unit 540. The synchronization acquisition/ channel estimation unit 540 acquires synchronization information of the frame signal, i.e. the received signal 600, and estimates channels based on the information received from the correlation measurer 520. Here, the acquired information is transmitted to the data restorer 420 of FIG. 9.

As described above, the present invention provides a preamble set useful for user or channel discrimination using a plurality of preambles, thus providing more stable user or channel discrimination.

A process of acquiring a preamble set in FIG. 6 will now be described herein below. The process below is intended to acquire preamble sets each comprised of 4 preambles, using 128-bit ARM sequences. First, all of the ARM sequences are created in step S110 of FIG. 6.

Table 1 tabulates the 128-bit ARM sequences created in step S110 of FIG. 6. In Table 1, values at the left side are indices of created ARM sequences and values at the right side are the ARM sequences. The indices of the ARM sequences shown in Table 1 are used to facilitate understanding of the present invention and may be defined differently or may not be used according to the preambles. In step S120 of FIG. 6, cross-correlation values between created preamble sequences are calculated.

TABLE 1

| | |
|---|---|
| 1 | 00010010000111010001001011100010000100100001110111101101000111010001001000011101000100101110001011101101111000100001001011100010 |
| 2 | 01000111010010000100011110110111010001110100100010111000010010001000111010010000100011110110111101110001011011101000111010110111 |
| 3 | 00100001001011100010000111010001001000010010111011011110001011100010000101011100010000111010001110111101101000100100001110100001 |
| 4 | 01110100011110110111101001000010001110100011110111101100010110111101101110001111011011010010000100100010111000010001110100100000100 |
| 5 | 00011101000100100001110111101101000111010001001011100010000100100001110100010010010001110111101101111000101110101000111011111011101 |
| 6 | 01001000010001110100010010111000010010001000010001111011011101010001110100100000100011101001000100111000101101111011100001001001011000 |
| 7 | 00101110001000010010111011011110001011100010000111010001001000010010111001000010010111011011110101000111011111000101110110111110 |
| 8 | 01111011011101000111101111000101101111011101101111010100010000100011101000111101101110100011110111000101110000100010010101111011100001011 |
| 9 | 0001001011100010000100100011101000100101110001011101101111000100001010110001000010010001110111101010001110110001001000011101 |
| 10 | 010001111011011101000111010010000010001111011011110111000101101111010001111011010001110100100010111000010000100011101001000 |
| 11 | 0010000111010001001000010010111000100001110100011110111101010001001000011101000100100010111011011110001011100010000100101110 |
| 12 | 0111010010000100011101000111101101110100100001000101110000010011010000100011110110111111011101110101000011101011 |
| 13 | 000111011110110100011101000100100001110111101011110001011101101000111011101101010110100010001110111101000110010001001110100010010 |
| 14 | 010010001011100010010000100011101000100101110001011101110100010000111010111000100101000010001111010111010000100100011101100001 |
| 15 | 001011101101110011011000101110001000010010111011011110110010011011110001011111000101110110111110001011100100000101000010010010000100011101000 |
| 16 | 011111011100010110111110110111100011101111000101110000100100101011110111000101101111010111010010100011110100011111011011010110010111 |
| 17 | 0001001000011101111010100011101000100000111010001001011100010000100100001110111101010001110111101111000101110101000111101 |
| 18 | 010001110100100010111000010010000100011101001000010001111011011110100011010001001110000100010011010111110110110010000100011000011 |
| 19 | 00100001001011101101111000101110001000001001011100010000011101000100100001001011101101111000101110111101010001110111000101110 |
| 20 | 01110100011110111000101101111011101110001111011011110100010000100011101010000111101110001011111010000101001010111101010111111 |
| 21 | 00011101000100101110001000001001011100010000111011011010000010011010111101101011000001001011100010000100011101010000100010 |
| 22 | 010010001011110110111010001110100100001000110100100101110001001000010001111011011110100011101101111011100010011101000111 |
| 23 | 0010111000100001110100010010000011101001110100001110111110110111110001011100011000111010100010011100011010101101101100001 |
| 24 | 011110110110100100010000111010001110101101000010110110001111011101101011011110111001000010011101001000010010111100001000:110100 |
| 25 | 0001001011100010111011110000100001110101101011100001101111110100000010000011101000110110001111010010111100010 |
| 26 | 0100011110110111101110001011101110001111010011101001110101010001010100100000100011110110111011110110000100010010011001010111 |
| 27 | 0010000111010001101111011101101010001100011011101001011101010001101100100111010011001111100110001010110111011111010010001 |
| 28 | 01110100100001001000101110000100011110100010000100011011110000111011110111010111000010010001011000010000010111111101111100 |
| 29 | 000111011110110111100010111011010100011010100001011001010110101101111110011010101000100001100101110011110001111101 |
| 30 | 01001000101100101110111101110000100001011110001010110000010110111100011010101110000101011101010001111101000111011001000 |
| 31 | 0010111011110110100011010111100001011101011101101111010111111000101111111011111110100010001110111110100001110111100 |

TABLE 1-continued 234 1011100001001000101110001011011010001111011011110111000101101111101110000100100010111000101101111011100001001000100011101001000
235 11011110001011101101111011010001001000011101000111011110101000111011110001011101101111010100011101111000101110001000010010110
236 100010110111101110001011100001000111010010000100100010111000010010001011011110110010111000101101111010110101000111111011
237 111000100001001011100010110110100011101111011011110001011101101111000100010010110001011011010111100010000100100011101000100110
238 10110111010001111011011110111000010010001011100010110111101110001011011100100011110110111101110001011011101000100010000100111
239 110100010010000111010001110111100010110110111110110100011101111011010001001000001110100011011110101000010000010000100011100010000110001
240 10000100011101001000010010001011011110110001011000010010010010110000010000011101001000010011100001000111010001111011101001000
241 11101101111000100001001011100010000100100001110100010010110001011101101111000100001001011100010111010111000010111011011110000110
242 1011100010110111010001111011011101000110100100001000111011011111011110001011011001000111011111011010000011011101111011000110000
243 1101111011010001001000011101000100100001001011100010000111010001110111011101000100010011010100011111101110100011101111101110
244 10001011100001000111010010000100011101000111101101110100010000100100010101110000100100011101000111101101110100001001000101110
245 1110001011101101000111011110110100011100010001000011101111011011111000101110110100011101110110111100010001000010110
246 101101111011100010010001011100010010000100011101001000101110001011011100011100001001000101110001011111011011101001101000011
247 110100011101111000101110110111100010110001000011011110111011111101110111001110110111100010110110101000100100001
248 100011001000101011110111000101101111011101110001110111000111011110111100010000100111
249 111011010001110100010000110100010011000010000110100010000111011110110110001010111000010000111011110100010100100001
250 101110000101100010001110100100001000011101101110100011101001000011110001000010000011100110000101100001000011110011011111000
251 1101111000101110000100010011100010000110010001011000100010011110101101011101011110101110001011100010000100101110110111110000
252 10001011011110101101000111101101110011101100010011001011111000111101110001011010001110111000100111110110110100011111011100101110111
253 1110001000001001000011101000100010011001111110110111011110100011110111100011110001110011011110111011110100010010001101101
254 10110111010001110100010001101100111001001000011101101110100000010010100011110111000110
255 11010010001010001010101111010010001001011010111000101000010000111010001001
256 100001000111010001110110110100001110111000110110111101101110100010000100011101000111101101110100010000100011

Figure 4:
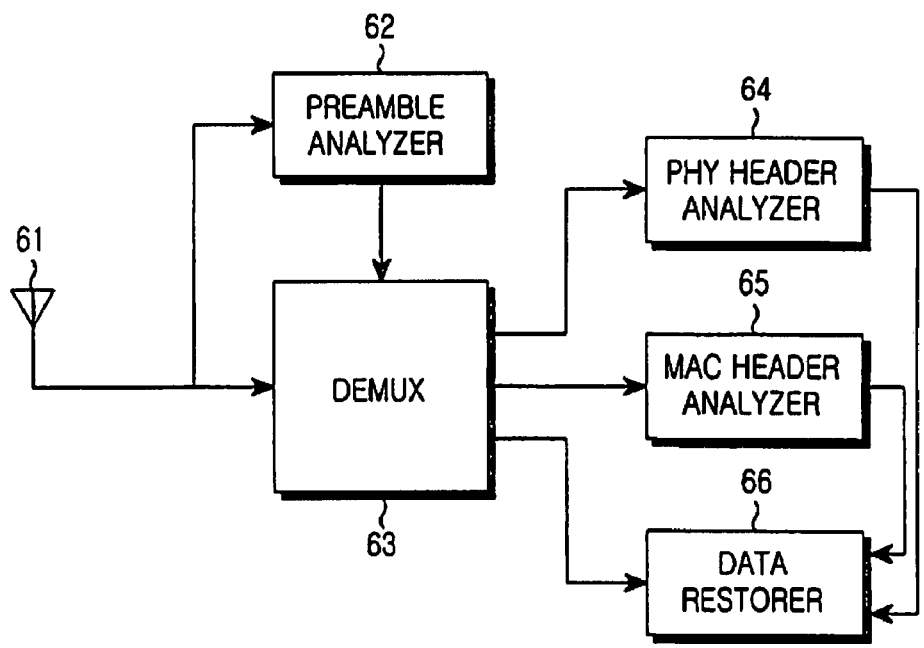
FIG. 4 is a block diagram of a receiver for the general communication system.

Table 2 tabulates the largest cross-correlation values among the calculated cross-correlation values in Table 1. Here, a larger cross-correlation value implies that similarity between two signals is high. Such high similarity is likely to cause generation of an error during analyzing of preambles and searching of synchronization in the preamble analyzer 62 of the receiver of FIG. 4. Thus, the largest cross-correlation value among cross-correlation values between corresponding sequences is used as a representative value.

TABLE 2

|    | 1   | 2   | 3   | 4   | 5   | 6   | 7   | 8   | 9   | 10  | 11  | 12  | 13  | 14  | 15  | 16  | 17  | 18  | 19  | 20  |
|----|-----|-----|-----|-----|-----|-----|-----|-----|-----|-----|-----|-----|-----|-----|-----|-----|-----|-----|-----|-----|
| 1  | 128 | 26  | 65  | 65  | 40  | 56  | 36  | 66  | 49  | 49  | 68  | 38  | 49  | 49  | 68  | 34  | 41  | 50  | 36  | 50  |
| 2  | 26  | 128 | 65  | 65  | 68  | 40  | 68  | 36  | 49  | 49  | 38  | 68  | 49  | 49  | 34  | 68  | 50  | 41  | 50  | 36  |
| 3  | 65  | 65  | 128 | 26  | 38  | 66  | 40  | 56  | 53  | 38  | 49  | 49  | 68  | 34  | 49  | 49  | 36  | 50  | 32  | 50  |
| 4  | 65  | 65  | 26  | 128 | 68  | 36  | 66  | 40  | 38  | 68  | 49  | 49  | 34  | 68  | 40  | 49  | 50  | 36  | 50  | 32  |
| 5  | 40  | 66  | 36  | 66  | 128 | 22  | 65  | 65  | 49  | 49  | 68  | 34  | 49  | 51  | 68  | 34  | 72  | 29  | 45  | 43  |
| 6  | 66  | 40  | 66  | 36  | 22  | 128 | 65  | 65  | 49  | 49  | 34  | 68  | 51  | 49  | 34  | 68  | 29  | 72  | 43  | 45  |
| 7  | 36  | 66  | 40  | 66  | 65  | 65  | 128 | 22  | 68  | 34  | 49  | 49  | 68  | 34  | 51  | 49  | 44  | 45  | 72  | 29  |
| 8  | 66  | 38  | 56  | 40  | 65  | 65  | 22  | 128 | 34  | 68  | 49  | 49  | 34  | 68  | 49  | 51  | 45  | 44  | 29  | 72  |
| 9  | 49  | 49  | 68  | 38  | 49  | 49  | 68  | 34  | 128 | 22  | 65  | 65  | 40  | 66  | 33  | 66  | 48  | 50  | 36  | 50  |
| 10 | 49  | 49  | 38  | 68  | 49  | 49  | 34  | 68  | 22  | 128 | 65  | 65  | 66  | 40  | 68  | 33  | 50  | 48  | 50  | 36  |
| 11 | 68  | 38  | 49  | 49  | 68  | 34  | 49  | 49  | 65  | 65  | 128 | 22  | 33  | 66  | 40  | 66  | 36  | 50  | 48  | 50  |
| 12 | 38  | 68  | 49  | 49  | 34  | 68  | 49  | 49  | 65  | 65  | 22  | 128 | 86  | 33  | 66  | 40  | 50  | 36  | 50  | 48  |
| 13 | 49  | 49  | 68  | 34  | 49  | 51  | 68  | 34  | 40  | 68  | 33  | 66  | 128 | 23  | 65  | 65  | 72  | 31  | 43  | 43  |
| 14 | 49  | 49  | 34  | 68  | 51  | 49  | 34  | 68  | 66  | 40  | 66  | 33  | 23  | 128 | 65  | 65  | 31  | 72  | 43  | 43  |
| 15 | 68  | 34  | 49  | 49  | 68  | 34  | 51  | 49  | 33  | 66  | 40  | 66  | 65  | 65  | 128 | 22  | 43  | 43  | 72  | 27  |

TABLE 2-continued

| | | | | | | | | | | | | | | | | | | | | |
|---|---|---|---|---|---|---|---|---|---|---|---|---|---|---|---|---|---|---|---|---|
| 16 | 34 | 68 | 49 | 49 | 34 | 68 | 49 | 51 | 66 | 33 | 66 | 40 | 65 | 65 | 22 | 128 | 43 | 43 | 27 | 72 |
| 17 | 41 | 50 | 36 | 50 | 72 | 20 | 44 | 45 | 48 | 50 | 36 | 50 | 72 | 31 | 43 | 43 | 128 | 22 | 65 | 65 |
| 18 | 50 | 41 | 50 | 36 | 29 | 72 | 45 | 44 | 50 | 48 | 50 | 36 | 31 | 72 | 43 | 43 | 22 | 128 | 65 | 66 |
| 19 | 36 | 50 | 32 | 50 | 45 | 43 | 72 | 29 | 36 | 50 | 48 | 50 | 43 | 43 | 72 | 27 | 65 | 65 | 128 | 22 |
| 20 | 50 | 36 | 50 | 32 | 43 | 45 | 29 | 72 | 50 | 38 | 50 | 48 | 43 | 43 | 27 | 72 | 66 | 65 | 22 | 128 |
| 21 | 72 | 29 | 45 | 43 | 41 | 50 | 36 | 50 | 72 | 27 | 43 | 43 | 48 | 50 | 36 | 50 | 33 | 66 | 33 | 66 |
| . | | | | | | | | | . | | | | | | | | | | | |
| 193 | 128 | 26 | 65 | 65 | 40 | 68 | 38 | 68 | 49 | 49 | 68 | 38 | 49 | 49 | 68 | 34 | 41 | 50 | 36 | 50 |
| 194 | 26 | 128 | 65 | 65 | 66 | 40 | 66 | 36 | 49 | 49 | 38 | 68 | 49 | 49 | 34 | 68 | 50 | 41 | 50 | 36 |
| 195 | 65 | 65 | 128 | 26 | 36 | 68 | 40 | 66 | 68 | 38 | 40 | 49 | 68 | 34 | 49 | 49 | 36 | 50 | 32 | 50 |
| 196 | 65 | 65 | 26 | 128 | 66 | 36 | 66 | 40 | 38 | 68 | 49 | 49 | 34 | 68 | 49 | 49 | 50 | 36 | 50 | 32 |
| 197 | 40 | 66 | 36 | 66 | 128 | 22 | 65 | 65 | 49 | 49 | 68 | 34 | 49 | 51 | 68 | 34 | 72 | 29 | 45 | 43 |
| 198 | 60 | 40 | 66 | 36 | 22 | 128 | 65 | 65 | 49 | 49 | 34 | 68 | 51 | 49 | 34 | 68 | 20 | 72 | 43 | 45 |
| 199 | 36 | 66 | 40 | 66 | 65 | 65 | 128 | 22 | 68 | 34 | 49 | 49 | 68 | 34 | 51 | 49 | 44 | 45 | 72 | 29 |
| 200 | 68 | 36 | 66 | 40 | 65 | 65 | 22 | 128 | 34 | 68 | 49 | 49 | 34 | 68 | 49 | 51 | 45 | 44 | 29 | 72 |
| 201 | 49 | 49 | 68 | 38 | 49 | 49 | 68 | 34 | 128 | 22 | 65 | 65 | 40 | 66 | 33 | 68 | 48 | 50 | 36 | 50 |
| 202 | 49 | 40 | 38 | 68 | 49 | 49 | 34 | 68 | 22 | 128 | 65 | 65 | 66 | 40 | 68 | 33 | 50 | 48 | 50 | 36 |
| 203 | 68 | 38 | 49 | 49 | 68 | 34 | 49 | 40 | 65 | 65 | 128 | 22 | 33 | 66 | 40 | 66 | 30 | 50 | 48 | 50 |
| 204 | 38 | 68 | 49 | 49 | 34 | 68 | 49 | 40 | 65 | 65 | 22 | 128 | 66 | 33 | 56 | 40 | 50 | 36 | 50 | 48 |
| 205 | 49 | 49 | 68 | 34 | 49 | 51 | 68 | 34 | 40 | 66 | 33 | 66 | 126 | 23 | 65 | 65 | 72 | 31 | 43 | 43 |
| 206 | 49 | 49 | 34 | 68 | 51 | 49 | 34 | 68 | 66 | 40 | 66 | 33 | 23 | 128 | 66 | 65 | 31 | 72 | 43 | 43 |
| 207 | 68 | 34 | 49 | 49 | 68 | 34 | 51 | 49 | 33 | 66 | 40 | 66 | 65 | 65 | 128 | 22 | 43 | 72 | 43 | 27 |
| 208 | 34 | 68 | 49 | 49 | 49 | 34 | 66 | 49 | 51 | 66 | 33 | 66 | 40 | 05 | 65 | 22 | 128 | 43 | 43 | 27 | 72 |
| 209 | 41 | 50 | 36 | 50 | 72 | 29 | 44 | 45 | 48 | 50 | 36 | 50 | 72 | 31 | 43 | 43 | 128 | 22 | 65 | 65 |
| 210 | 50 | 41 | 50 | 36 | 29 | 72 | 45 | 44 | 50 | 48 | 50 | 36 | 31 | 72 | 43 | 43 | 22 | 128 | 65 | 65 |
| 211 | 36 | 50 | 32 | 50 | 45 | 43 | 72 | 29 | 36 | 50 | 48 | 50 | 43 | 43 | 72 | 27 | 65 | 65 | 128 | 22 |
| . | | | | | | | | | . | | | | | | | | | | | |
| 245 | 40 | 33 | 52 | 31 | 33 | 33 | 52 | 42 | 40 | 46 | 29 | 46 | 80 | 30 | 43 | 43 | 56 | 35 | 60 | 34 |
| 246 | 33 | 40 | 31 | 52 | 33 | 33 | 42 | 52 | 46 | 40 | 46 | 29 | 30 | 80 | 43 | 36 | 56 | 34 | 60 | |
| 247 | 52 | 26 | 40 | 33 | 52 | 42 | 33 | 33 | 28 | 46 | 40 | 45 | 43 | 43 | 80 | 30 | 60 | 34 | 56 | 35 |
| 248 | 26 | 52 | 33 | 40 | 42 | 52 | 33 | 33 | 46 | 28 | 46 | 40 | 43 | 43 | 30 | 60 | 34 | 60 | 35 | 56 |
| 249 | 80 | 30 | 43 | 43 | 40 | 46 | 36 | 46 | 33 | 42 | 52 | 30 | 40 | 33 | 52 | 26 | 60 | 30 | 43 | 41 |
| 250 | 30 | 80 | 43 | 43 | 46 | 40 | 46 | 36 | 42 | 33 | 52 | 33 | 40 | 26 | 52 | 30 | 60 | 41 | 43 | |
| 251 | 43 | 43 | 80 | 30 | 36 | 46 | 40 | 46 | 52 | 30 | 39 | 42 | 52 | 31 | 40 | 33 | 41 | 43 | 80 | 30 |
| 252 | 43 | 43 | 30 | 80 | 46 | 36 | 46 | 40 | 30 | 52 | 42 | 39 | 31 | 52 | 33 | 40 | 43 | 41 | 30 | 80 |
| 253 | 40 | 46 | 36 | 48 | 80 | 38 | 43 | 43 | 40 | 33 | 52 | 31 | 33 | 33 | 52 | 42 | 40 | 46 | 36 | 42 |
| 254 | 46 | 40 | 46 | 36 | 38 | 80 | 43 | 43 | 33 | 40 | 31 | 52 | 33 | 33 | 42 | 52 | 46 | 40 | 42 | 36 |
| 255 | 36 | 46 | 40 | 46 | 43 | 43 | 80 | 38 | 52 | 26 | 40 | 33 | 52 | 42 | 33 | 33 | 36 | 42 | 40 | 46 |
| 256 | 46 | 36 | 46 | 40 | 43 | 43 | 38 | 60 | 26 | 52 | 33 | 40 | 42 | 52 | 33 | 33 | 42 | 36 | 46 | 40 |

| | 21 | ... | 245 | 246 | 247 | 248 | 249 | 250 | 251 | 252 | 253 | 254 | 155 | 256 |
|---|---|---|---|---|---|---|---|---|---|---|---|---|---|---|
| 1 | 72 | ... | 33 | 42 | 52 | 30 | 40 | 33 | 52 | 26 | 80 | 30 | 43 | 43 |
| 2 | 29 | | 42 | 33 | 30 | 52 | 33 | 40 | 26 | 52 | 30 | 80 | 43 | 43 |
| 3 | 45 | | 52 | 30 | 39 | 42 | 52 | 31 | 40 | 33 | 43 | 43 | 80 | 30 |
| 4 | 43 | | 30 | 52 | 42 | 39 | 31 | 52 | 33 | 40 | 43 | 43 | 30 | 80 |
| 5 | 41 | | 40 | 33 | 52 | 31 | 33 | 33 | 52 | 42 | 40 | 46 | 36 | 46 |
| 6 | 50 | | 33 | 40 | 31 | 52 | 33 | 33 | 42 | 52 | 46 | 40 | 46 | 36 |
| 7 | 38 | | 52 | 26 | 40 | 33 | 52 | 42 | 33 | 33 | 38 | 46 | 40 | 46 |
| 8 | 50 | | 26 | 52 | 33 | 40 | 42 | 52 | 33 | 33 | 48 | 36 | 46 | 40 |
| 9 | 72 | | 60 | 30 | 43 | 43 | 40 | 46 | 28 | 46 | 33 | 42 | 52 | 30 |
| 10 | 27 | | 30 | 80 | 43 | 43 | 46 | 40 | 46 | 28 | 42 | 33 | 30 | 52 |
| 11 | 43 | | 43 | 43 | 80 | 30 | 20 | 46 | 40 | 46 | 52 | 30 | 39 | 42 |
| 12 | 43 | | 43 | 43 | 30 | 80 | 46 | 29 | 46 | 40 | 30 | 52 | 42 | 39 |
| 13 | 48 | | 40 | 46 | 29 | 46 | 80 | 30 | 43 | 43 | 40 | 33 | 52 | 31 |
| 14 | 50 | | 48 | 40 | 46 | 29 | 30 | 80 | 43 | 43 | 33 | 40 | 31 | 52 |
| 15 | 36 | | 28 | 46 | 40 | 46 | 43 | 43 | 80 | 30 | 52 | 26 | 40 | 33 |
| 16 | 50 | | 46 | 28 | 48 | 40 | 43 | 43 | 30 | 80 | 26 | 52 | 33 | 40 |
| 17 | 33 | | 04 | 46 | 52 | 34 | 56 | 35 | 60 | 34 | 80 | 30 | 41 | 43 |
| 18 | 68 | | 46 | 64 | 34 | 52 | 35 | 56 | 34 | 00 | 30 | 80 | 43 | 41 |
| 19 | 33 | | 52 | 34 | 64 | 46 | 60 | 34 | 56 | 35 | 43 | 41 | 80 | 30 |
| 20 | 66 | | 34 | 52 | 46 | 84 | 34 | 60 | 35 | 56 | 41 | 43 | 30 | 80 |
| 21 | 128 | | 56 | 35 | 60 | 34 | 64 | 34 | 52 | 46 | 40 | 42 | 36 | 46 |
| . | | | | | | | | . | | | | | | |
| 193 | 72 | ... | 40 | 33 | 52 | 28 | 80 | 30 | 43 | 43 | 40 | 46 | 36 | 46 |
| 194 | 29 | | 33 | 40 | 26 | 52 | 30 | 60 | 43 | 43 | 46 | 40 | 46 | 36 |
| 195 | 45 | | 52 | 31 | 40 | 33 | 43 | 43 | 80 | 30 | 38 | 46 | 40 | 46 |
| 196 | 43 | | 31 | 52 | 33 | 40 | 43 | 43 | 30 | 80 | 46 | 36 | 46 | 40 |
| 197 | 41 | | 33 | 33 | 52 | 42 | 40 | 46 | 36 | 46 | 80 | 38 | 43 | 43 |
| 198 | 50 | | 33 | 33 | 42 | 52 | 46 | 40 | 46 | 36 | 38 | 80 | 43 | 43 |
| 199 | 36 | | 52 | 42 | 33 | 33 | 36 | 46 | 40 | 45 | 43 | 43 | 80 | 38 |
| 200 | 50 | | 42 | 52 | 33 | 33 | 46 | 36 | 46 | 40 | 43 | 43 | 38 | 80 |
| 201 | 72 | | 40 | 46 | 26 | 46 | 33 | 42 | 52 | 30 | 40 | 33 | 52 | 26 |

TABLE 2-continued

| | | | | | | | | | | | | | |
|---|---|---|---|---|---|---|---|---|---|---|---|---|---|
| 202 | 27 | 48 | 40 | 48 | 28 | 42 | 33 | 30 | 52 | 33 | 40 | 26 | 52 |
| 203 | 43 | 29 | 46 | 40 | 46 | 52 | 30 | 39 | 42 | 52 | 31 | 40 | 33 |
| 204 | 43 | 46 | 29 | 46 | 40 | 30 | 52 | 42 | 39 | 31 | 52 | 33 | 40 |
| 205 | 48 | 80 | 30 | 43 | 43 | 40 | 33 | 52 | 31 | 33 | 33 | 52 | 42 |
| 206 | 50 | 30 | 80 | 43 | 43 | 33 | 40 | 31 | 52 | 33 | 33 | 42 | 52 |
| 207 | 36 | 43 | 43 | 60 | 30 | 52 | 28 | 40 | 33 | 52 | 42 | 33 | 33 |
| 208 | 50 | 43 | 43 | 30 | 80 | 26 | 52 | 33 | 40 | 42 | 52 | 33 | 33 |
| 209 | 33 | 56 | 35 | 60 | 34 | 80 | 30 | 41 | 43 | 40 | 46 | 36 | 42 |
| 210 | 66 | 35 | 56 | 34 | 60 | 30 | 80 | 43 | 41 | 46 | 40 | 42 | 38 |
| 211 | 33 | 60 | 34 | 56 | 35 | 43 | 41 | 80 | 30 | 36 | 42 | 40 | 46 |
| . | | ... | | | | | . | | | | | | |
| . | | | | | | | | | | | | | |
| . | | | | | | | | | | | | | |
| 245 | 64 | ... | 128 | 25 | 65 | 66 | 49 | 49 | 68 | 34 | 49 | 51 | 68 | 34 |
| 246 | 34 | | 25 | 128 | 65 | 65 | 49 | 49 | 34 | 68 | 51 | 49 | 34 | 68 |
| 247 | 52 | | 65 | 65 | 128 | 19 | 68 | 34 | 49 | 49 | 68 | 34 | 51 | 49 |
| 248 | 46 | | 65 | 65 | 19 | 128 | 34 | 68 | 49 | 49 | 34 | 68 | 49 | 51 |
| 249 | 40 | | 49 | 49 | 68 | 34 | 128 | 23 | 65 | 65 | 33 | 66 | 33 | 66 |
| 250 | 42 | | 49 | 49 | 34 | 68 | 23 | 128 | 65 | 65 | 66 | 33 | 68 | 33 |
| 251 | 36 | | 68 | 34 | 49 | 49 | 65 | 65 | 128 | 22 | 33 | 66 | 35 | 68 |
| 252 | 48 | | 34 | 68 | 49 | 49 | 65 | 65 | 22 | 128 | 66 | 33 | 66 | 35 |
| 253 | 80 | | 49 | 51 | 58 | 34 | 33 | 66 | 33 | 66 | 128 | 26 | 65 | 65 |
| 254 | 30 | | 51 | 49 | 34 | 68 | 66 | 33 | 66 | 33 | 26 | 128 | 65 | 65 |
| 255 | 43 | | 68 | 34 | 51 | 49 | 33 | 68 | 35 | 66 | 65 | 65 | 128 | 26 |
| 256 | 41 | | 34 | 68 | 49 | 51 | 68 | 33 | 66 | 35 | 65 | 65 | 26 | 128 |

A preamble set having the minimum value among the representative values of Table 2 should be constructed. By acquiring a limit cross-correlation value that makes the cross-correlation value to be the smallest, it is possible to minimize the possibility of the generation of an error when the preamble analyzer 62 of FIG. 4 analyzes the preambles.

To construct the preamble set of the smallest cross-correlation values in step S130 of FIG. 6, one representative value that is largest or smallest is set as the limit cross-correlation value. An appropriate preamble set is searched for using the set representative value. According to the present invention, the representative value set in step S310 of FIG. 6 is set to 31.

Table 3 tabulates a preamble set calculated using the representative value '31'. As shown in Table 3, there are 128 preamble sets. Here, if the representative value is lowered to 30, there is no appropriate preamble set since when any 4 sequences are selected from among the 256 sequences, the lowest limit of all cross correlation values pertaining to the selected sequence group is 31.

TABLE 3

| s1 | s2 | s3 | s4 | s1:s2 | s1:s3 | s1:s4 | s2:s3 | s2:s4 | s3:s4 | s1 | s2 | s3 | s4 | s1:s2 | s1:s3 | s1:s4 | s2:s3 | s2:s4 | s3:s4 |
|---|---|---|---|---|---|---|---|---|---|---|---|---|---|---|---|---|---|---|---|
| 17 | 47 | 86 | 108 | 28 | 31 | 30 | 30 | 23 | 29 | 41 | 84 | 110 | 215 | 30 | 23 | 28 | 29 | 31 | 30 |
| 17 | 47 | 86 | 172 | 28 | 31 | 30 | 30 | 23 | 29 | 41 | 84 | 174 | 215 | 30 | 23 | 28 | 29 | 31 | 30 |
| 17 | 47 | 108 | 150 | 28 | 30 | 31 | 23 | 30 | 29 | 41 | 110 | 148 | 215 | 23 | 30 | 28 | 29 | 30 | 31 |
| 17 | 47 | 150 | 172 | 28 | 31 | 30 | 30 | 23 | 29 | 41 | 148 | 174 | 215 | 30 | 23 | 28 | 29 | 31 | 30 |
| 17 | 86 | 108 | 239 | 31 | 30 | 28 | 29 | 30 | 23 | 42 | 83 | 109 | 216 | 30 | 23 | 28 | 29 | 31 | 30 |
| 17 | 86 | 172 | 239 | 31 | 30 | 28 | 29 | 30 | 23 | 42 | 83 | 173 | 216 | 30 | 23 | 28 | 29 | 31 | 30 |
| 17 | 108 | 150 | 239 | 30 | 31 | 28 | 29 | 23 | 30 | 42 | 109 | 147 | 216 | 23 | 30 | 28 | 29 | 30 | 31 |
| 17 | 150 | 172 | 239 | 31 | 30 | 28 | 29 | 30 | 23 | 42 | 147 | 173 | 216 | 30 | 23 | 28 | 29 | 31 | 30 |
| 18 | 48 | 85 | 107 | 28 | 31 | 30 | 30 | 23 | 29 | 43 | 82 | 112 | 213 | 30 | 23 | 29 | 28 | 31 | 30 |
| 18 | 48 | 85 | 171 | 28 | 31 | 30 | 30 | 23 | 29 | 43 | 82 | 176 | 213 | 30 | 23 | 29 | 28 | 31 | 30 |
| 18 | 48 | 107 | 149 | 28 | 30 | 31 | 23 | 30 | 29 | 43 | 112 | 146 | 213 | 23 | 30 | 29 | 28 | 30 | 31 |
| 18 | 48 | 149 | 171 | 28 | 31 | 30 | 30 | 23 | 29 | 43 | 146 | 176 | 213 | 30 | 23 | 29 | 28 | 31 | 30 |
| 18 | 85 | 107 | 240 | 31 | 30 | 28 | 29 | 30 | 23 | 44 | 81 | 111 | 214 | 30 | 23 | 29 | 28 | 31 | 30 |
| 18 | 85 | 171 | 240 | 31 | 30 | 28 | 29 | 30 | 23 | 44 | 81 | 175 | 214 | 30 | 23 | 29 | 28 | 31 | 30 |
| 18 | 107 | 149 | 240 | 30 | 31 | 28 | 29 | 23 | 30 | 44 | 111 | 145 | 214 | 23 | 30 | 29 | 28 | 30 | 31 |
| 18 | 149 | 171 | 240 | 31 | 30 | 28 | 29 | 30 | 23 | 44 | 145 | 175 | 214 | 30 | 23 | 29 | 28 | 31 | 30 |
| 19 | 45 | 88 | 106 | 29 | 31 | 30 | 30 | 23 | 28 | 45 | 88 | 106 | 211 | 30 | 23 | 29 | 28 | 31 | 30 |
| 19 | 45 | 88 | 170 | 29 | 31 | 30 | 30 | 23 | 28 | 45 | 88 | 170 | 211 | 30 | 23 | 29 | 28 | 31 | 30 |
| 19 | 45 | 106 | 152 | 29 | 30 | 31 | 23 | 30 | 28 | 45 | 106 | 152 | 211 | 23 | 30 | 29 | 28 | 30 | 31 |
| 19 | 45 | 152 | 170 | 29 | 31 | 30 | 30 | 23 | 28 | 45 | 152 | 170 | 211 | 30 | 23 | 29 | 28 | 31 | 30 |
| 19 | 88 | 106 | 237 | 31 | 30 | 29 | 28 | 30 | 23 | 46 | 87 | 105 | 212 | 30 | 23 | 29 | 28 | 31 | 30 |
| 19 | 88 | 170 | 237 | 31 | 30 | 29 | 28 | 30 | 23 | 46 | 87 | 169 | 212 | 30 | 23 | 29 | 28 | 31 | 30 |
| 19 | 106 | 152 | 237 | 30 | 31 | 29 | 28 | 23 | 30 | 46 | 105 | 151 | 212 | 23 | 30 | 29 | 28 | 30 | 31 |
| 19 | 152 | 170 | 237 | 31 | 30 | 29 | 28 | 30 | 23 | 46 | 151 | 169 | 212 | 30 | 23 | 29 | 28 | 31 | 30 |
| 20 | 46 | 87 | 105 | 29 | 31 | 30 | 30 | 23 | 28 | 47 | 86 | 108 | 209 | 30 | 23 | 28 | 29 | 31 | 30 |
| 20 | 46 | 87 | 169 | 29 | 31 | 30 | 30 | 23 | 28 | 47 | 86 | 172 | 209 | 30 | 23 | 28 | 29 | 31 | 30 |
| 20 | 46 | 105 | 151 | 29 | 30 | 31 | 23 | 30 | 28 | 47 | 108 | 150 | 209 | 23 | 30 | 28 | 29 | 30 | 31 |
| 20 | 46 | 151 | 169 | 29 | 31 | 30 | 30 | 23 | 28 | 47 | 150 | 172 | 209 | 30 | 23 | 28 | 29 | 31 | 30 |
| 20 | 87 | 105 | 238 | 31 | 30 | 29 | 28 | 30 | 23 | 48 | 85 | 107 | 210 | 30 | 23 | 28 | 29 | 31 | 30 |
| 20 | 87 | 169 | 238 | 31 | 30 | 29 | 28 | 30 | 23 | 48 | 85 | 171 | 210 | 30 | 23 | 28 | 29 | 31 | 30 |
| 20 | 105 | 151 | 238 | 30 | 31 | 29 | 28 | 23 | 30 | 48 | 107 | 149 | 210 | 23 | 30 | 28 | 29 | 30 | 31 |
| 20 | 151 | 169 | 238 | 31 | 30 | 29 | 28 | 30 | 23 | 48 | 149 | 171 | 210 | 30 | 23 | 28 | 29 | 31 | 30 |

TABLE 3-continued

| s1 | s2 | s3 | s4 | s1:s2 | s1:s3 | s1:s4 | s2:s3 | s2:s4 | s3:s4 | s1 | s2 | s3 | s4 | s1:s2 | s1:s3 | s1:s4 | s2:s3 | s2:s4 | s3:s4 |
|---|---|---|---|---|---|---|---|---|---|---|---|---|---|---|---|---|---|---|---|
| 21 | 43 | 82 | 112 | 29 | 31 | 30 | 30 | 23 | 28 | 81 | 111 | 214 | 236 | 28 | 31 | 30 | 30 | 23 | 29 |
| 21 | 43 | 82 | 176 | 29 | 31 | 30 | 30 | 23 | 28 | 81 | 175 | 214 | 236 | 28 | 31 | 30 | 30 | 23 | 29 |
| 21 | 43 | 112 | 146 | 29 | 30 | 31 | 23 | 30 | 28 | 82 | 112 | 213 | 235 | 28 | 31 | 30 | 30 | 23 | 29 |
| 21 | 43 | 146 | 176 | 29 | 31 | 30 | 30 | 23 | 28 | 82 | 176 | 213 | 235 | 28 | 31 | 30 | 30 | 23 | 29 |
| 21 | 82 | 112 | 235 | 31 | 30 | 29 | 28 | 30 | 23 | 83 | 109 | 216 | 234 | 29 | 31 | 30 | 30 | 23 | 28 |
| 21 | 82 | 176 | 235 | 31 | 30 | 29 | 28 | 30 | 23 | 83 | 173 | 216 | 234 | 29 | 31 | 30 | 30 | 23 | 28 |
| 21 | 112 | 146 | 235 | 30 | 31 | 29 | 28 | 23 | 30 | 84 | 110 | 215 | 233 | 29 | 31 | 30 | 30 | 23 | 28 |
| 21 | 146 | 176 | 235 | 31 | 30 | 29 | 28 | 30 | 23 | 84 | 174 | 215 | 233 | 29 | 31 | 30 | 30 | 23 | 28 |
| 22 | 44 | 81 | 111 | 29 | 31 | 30 | 30 | 23 | 28 | 85 | 107 | 210 | 240 | 29 | 31 | 30 | 30 | 23 | 28 |
| 22 | 44 | 81 | 175 | 29 | 31 | 30 | 30 | 23 | 28 | 85 | 171 | 210 | 240 | 29 | 31 | 30 | 30 | 23 | 28 |
| 22 | 44 | 111 | 145 | 29 | 30 | 31 | 23 | 30 | 28 | 86 | 108 | 209 | 239 | 29 | 31 | 30 | 30 | 23 | 28 |
| 22 | 44 | 145 | 175 | 29 | 31 | 30 | 30 | 23 | 28 | 86 | 172 | 209 | 239 | 29 | 31 | 30 | 30 | 23 | 28 |
| 22 | 81 | 111 | 236 | 31 | 30 | 29 | 28 | 30 | 23 | 87 | 105 | 212 | 238 | 28 | 31 | 30 | 30 | 23 | 29 |
| 22 | 81 | 175 | 236 | 31 | 30 | 29 | 28 | 30 | 23 | 87 | 169 | 212 | 238 | 28 | 31 | 30 | 30 | 23 | 29 |
| 22 | 111 | 145 | 236 | 30 | 31 | 29 | 28 | 23 | 30 | 88 | 106 | 211 | 237 | 28 | 31 | 30 | 30 | 23 | 29 |
| 22 | 145 | 175 | 236 | 31 | 30 | 29 | 28 | 30 | 23 | 88 | 170 | 211 | 237 | 28 | 31 | 30 | 30 | 23 | 29 |
| 23 | 41 | 84 | 110 | 28 | 31 | 30 | 30 | 23 | 29 | 105 | 151 | 212 | 238 | 28 | 30 | 23 | 31 | 30 | 29 |
| 23 | 41 | 84 | 174 | 28 | 31 | 30 | 30 | 23 | 29 | 106 | 152 | 211 | 237 | 28 | 30 | 23 | 31 | 30 | 29 |
| 23 | 41 | 110 | 148 | 28 | 30 | 31 | 23 | 30 | 29 | 107 | 149 | 210 | 240 | 29 | 30 | 23 | 31 | 30 | 28 |
| 23 | 41 | 148 | 174 | 28 | 31 | 30 | 30 | 23 | 29 | 108 | 150 | 209 | 239 | 29 | 30 | 23 | 31 | 30 | 28 |
| 23 | 84 | 110 | 233 | 31 | 30 | 28 | 29 | 30 | 23 | 109 | 147 | 216 | 234 | 29 | 30 | 23 | 31 | 30 | 28 |
| 23 | 84 | 174 | 233 | 31 | 30 | 28 | 29 | 30 | 23 | 110 | 148 | 215 | 233 | 29 | 30 | 23 | 31 | 30 | 28 |
| 23 | 110 | 148 | 233 | 30 | 31 | 28 | 29 | 23 | 30 | 111 | 145 | 214 | 236 | 28 | 30 | 23 | 31 | 30 | 29 |
| 23 | 148 | 174 | 233 | 31 | 30 | 28 | 29 | 30 | 23 | 112 | 146 | 213 | 235 | 28 | 30 | 23 | 31 | 30 | 29 |
| 24 | 42 | 83 | 109 | 28 | 31 | 30 | 30 | 23 | 29 | 145 | 175 | 214 | 236 | 28 | 31 | 30 | 30 | 23 | 29 |
| 24 | 42 | 83 | 173 | 28 | 31 | 30 | 30 | 23 | 29 | 146 | 176 | 213 | 235 | 28 | 31 | 30 | 30 | 23 | 29 |
| 24 | 42 | 109 | 147 | 28 | 30 | 31 | 23 | 30 | 29 | 147 | 173 | 216 | 234 | 29 | 31 | 30 | 30 | 23 | 28 |
| 24 | 42 | 147 | 173 | 28 | 31 | 30 | 30 | 23 | 29 | 148 | 174 | 215 | 233 | 29 | 31 | 30 | 30 | 23 | 28 |
| 24 | 83 | 109 | 234 | 31 | 30 | 28 | 29 | 30 | 23 | 149 | 171 | 210 | 240 | 29 | 31 | 30 | 30 | 23 | 28 |
| 24 | 83 | 173 | 234 | 31 | 30 | 28 | 29 | 30 | 23 | 150 | 172 | 209 | 239 | 29 | 31 | 30 | 30 | 23 | 28 |
| 24 | 109 | 147 | 234 | 30 | 31 | 28 | 29 | 23 | 30 | 151 | 169 | 212 | 238 | 28 | 31 | 30 | 30 | 23 | 29 |
| 24 | 147 | 173 | 234 | 31 | 30 | 28 | 29 | 30 | 23 | 152 | 170 | 211 | 237 | 28 | 31 | 30 | 30 | 23 | 29 |

If one preamble set is selected from among the 128 preambles sets and is used to discriminate users or channels, a preamble set having a superior auto-correlation and cross-correlation that is less than 31 can be used.

Once a preamble set is determined in a communication system, the preamble selector 120 of FIG. 8 selects one from among preambles of the preamble set and transmits the preamble information to the preamble generator 140 of FIG. 8. The preamble generator 140 generates preambles using the preamble information.

Once the preambles included in a frame are transmitted from the transmitter to the receiver, the preamble analyzer 500 of FIG. 9 analyzes the preambles. At this time, the preamble analyzer 500 detects the preambles selected by the preamble selector 120 of FIG. 8 and creates the preamble information through the correlation measurer 520 of FIG. 10.

By providing a preamble set to discriminate between users or channels using a plurality of preambles, it is possible to more stably discriminate users or channels.

According to an embodiment of the present invention, by providing a preamble set to discriminate between users or channels using a plurality of preambles, it is possible to more stably discriminate the users or channels.

By lowering cross-correlation to the smallest possible value, users or channels can be discriminated while the preambles are not affected in acquiring synchronization information.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A communication system for generating a preamble sequence group, the communication system comprising:

a transmitter for creating preambles using a preamble included in a predetermined preamble set, multiplexing the created preambles and transmission data, and transmitting the multiplexed preambles and transmission data; and a receiver for detecting the preambles, synchronization information and channel estimation information from signals transmitted from the transmitter, and restoring the transmission data.

2. The communication system of claim 1 wherein the transmission data includes a media access control header and a physical header.

3. The communication system of claim 2 wherein the receiver comprises:

a preamble analyzer, comprising:

a preamble generator for generating preambles agreed between the transmitter and the receiver;

a correlation measurer for measuring cross-correlation between the signals received from the transmitter and the preambles created in the preamble generator, and outputting information related to the preambles included in the received signals; and a synchronization acquisition/channel estimation unit for acquiring synchronization information of the received signals based on the cross-correlation and the preamble information, and estimating the channels.

* * * * *